April 7, 1959 J. T. WILNER 2,881,248

CAMERA TUBE BURN-IN PREVENTION

Filed May 9, 1956 3 Sheets-Sheet 1

INVENTOR

John T. Wilner,

BY Karl W. Flocks

ATTORNEY

April 7, 1959 J. T. WILNER 2,881,248

CAMERA TUBE BURN-IN PREVENTION

Filed May 9, 1956 3 Sheets-Sheet 2

INVENTOR
John T. Wilner,

BY Karl W. Flocks
ATTORNEY

April 7, 1959 J. T. WILNER 2,881,248

CAMERA TUBE BURN-IN PREVENTION

Filed May 9, 1956 3 Sheets-Sheet 3

INVENTOR

John T. Wilner,

BY Karl W. Flocks

ATTORNEY

United States Patent Office 2,881,248

Patented Apr. 7, 1959

2,881,248

CAMERA TUBE BURN-IN PREVENTION

John T. Wilner, Baltimore, Md., assignor to WBAL Division, The Hearst Corporation, Baltimore, Md., a corporation of Maryland Application May 9, 1956, Serial No. 583,690

12 Claims. (Cl. 178—7.2)

This invention relates to television cameras, and more particularly to a means for preventing damage thereto.

Of the various kinds of "storage-type" cathode ray tubes used as the camera in television systems, the "Iconoscope" and the "Orthicon" have perhaps become the best known. These tubes are used to convert light rays into electrical energy in order to transmit a picture of a scene, or whatever is viewed by the camera, to receiving television sets. The camera tube, however, is very delicate and may be readily damaged. One hazard which causes more damaged camera tubes perhaps than any other hazard results from prolonged light rays falling on the same segment of the tube producing what has been termed "burn-in."

The commonly used types of television camera tubes are well known to those skilled in the art and their method of operation is well understood. Accordingly, no detailed reference to the tube per se will be made herein, except for a broad reference in connection with the present invention.

Generally, the light rays from a scene or object to be transmitted by the television system are passed through an optical lens which focuses them on the surface of a small mosaic screen which is the front of the camera tube. The inner surface of the screen is coated with an extremely fine layer of a suitable photo-emissive material such as, for example, cesiated-oxidized silver bismuth. Other materials, of course, may be used and are used. The light and dark shades of the light rays of a scene, which is focused upon this surface, determine the amount of electron emission from each spot on the photo-emissive material to a corresponding spot on the next plate electrode. It, therefore, can readily be seen that a prolonged view of the same scene would result in sufficient energy being stored in each dot on the photo-emissive screen to cause it to continue to emit electrons to the next electrode even after the lens is focused on another scene, or even a complete deletion and destruction of the coating at certain brighter spots producing the "burn-in" effect.

There is another kind of "burn-in" effect which is produced by the focusing of the electrons from the photosensitive faceplate onto the "target." This invention will, of course, eliminate this type of "burn-in" also.

The present invention is concerned with the provision of such damage to the television camera tube as previously described. Broadly, the invention involves a means for effecting a slight motion to the lens of the television camera to cause the scene which is focused upon the camera tube to be constantly shifted slowly from one side to the other, or around in a circular motion. Electrical means is then inserted into the horizontal centering circuit to electrically compensate for the slight motion of the picture, if desired.

Accordingly, one of the objects of the present invention is to prevent burn-in damage to a television camera tube.

Another object of the present invention is to provide for motion to the image viewed by a television camera.

A further object of the present invention is to provide means for cancelling the effect of the motion produced in the image.

Other objects and the nature and advantages of the instant invention will be apparent from the following description taken in conjunction with the accompanying drawings, wherein.

Figure 1:
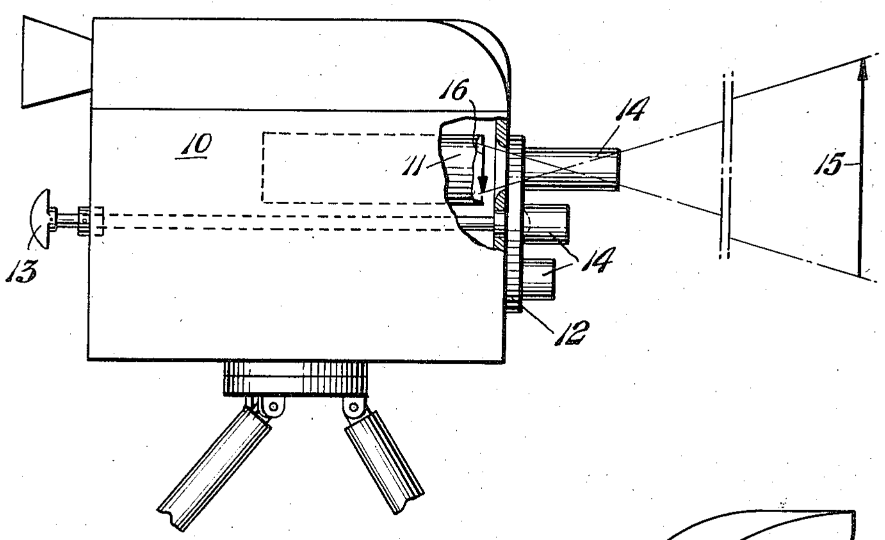
Fig. 1 is a side view of a television camera.

Referring first to Fig. 1 of the drawings, the reference numeral 10 identifies the overall television camera in which the camera tube 11 is located. A lens mounting board 12 is located at the front of the camera and may be rotated by a handle 13 to select any one of several optical lenses 14—14 to focus an object or scene 15 on the camera tube 11 at 16. Although any one of several camera tubes may be used in a television camera, the image orthicon type will be referred to herein for the sake of uniformity, it being understood that the present invention will in no way be limited to that particular type of tube.

Figure 2:
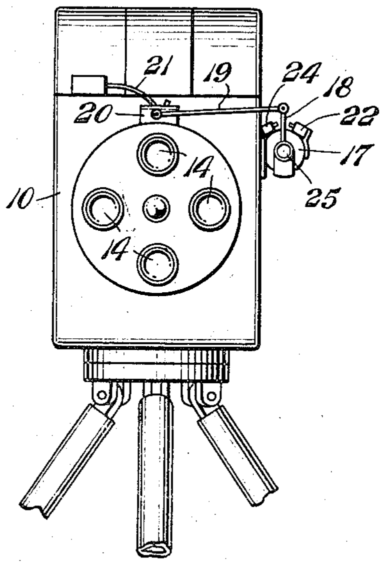
Fig. 2 is a front view of a television camera showing the effective relationship of the elements of one embodiment of the present invention.

Fig. 2 shows the operable elements of one embodiment of the present invention. The fundamental principle of the present invention involves the application of slight motion to the lens mounting board 12 to cause it to move first in one direction and then in the other, for example, first clockwise and then counter-clockwise. The movement need only be in the neighborhood of plus or minus 1/32 of an inch, but the exact amount is in no way significant.

To obtain this motion, a motor 17 rotates a shaft 23 at a very slow speed as, for example, one revolution per minute, or any speed suitable for the result to be accomplished. The speed of the motor 17 may be such as to produce the desired rotation, or suitable gear reduction means may be used. Mounted on the shaft 23 is an arm 18 which is securely fastened thereto. At a suitable point on the arm 18 to obtain a desired leverage, one end of a linkage 19 is secured as by bolt, rivet, pin, etc. The other end of the linkage 19 is secured either directly or through suitable clutch means 20 to the lens mounting board 12. A spring 21 may be used to maintain pressure on the clutch 20 to keep it in operable contact against the lens mounting board 12. It can now readily be seen that rotation of the motor shaft 23 in a clockwise direction will also rotate the arm 18 in a clockwise direction and, through the linkage 19, the lens mounting board 12 will be rotated in a clockwise direction. It is, of course, apparent that by attaching the linkage 19 to the bottom of the lens mounting board 12, a counter-clockwise motion will be imparted thereto by a clockwise motion of the motor shaft 23 and the arm 18.

As the arm 18 moves through a predetermined distance to rotate the lens mounting board 12, the desired amount, as, for example, 1/32 of an inch, a microswitch 22 is actuated to cause reversal of the motor 17. Of course, a mercury switch or any other suitable switch could be used as would be obvious to anyone skilled in the art, but for the sake of this description, a microswitch will be referred to.

Upon reversal of the motor 17, the shaft 23, previously described as rotating in a clockwise direction, will now rotate in a counter-clockwise direction. The linkage 19, connected to the arm 18, will now impart a rotation to the lens mounting board 12 in an opposite direction as previously described. The shaft 23 continues its slow rotation in this direction until the microswitch 24 is actuated. The actuation of the microswitch 24 reverses the motor 17 such that the shaft 23 will now rotate in a clockwise direction as described initially. Thus, it is readily apparent that the lens mounting board can be slowly rocked to and fro at a predetermined rate and to a predetermined degree. The result will be that an object or scene being focused on the image-orthicon 11 as at 16 will be slowly moved from side to side, thus preventing the danger of "burn-in" previously described.

To avoid the transmission of a television picture which contains such a shifting motion, even though such motion is slight, electrical compensating means may be provided to electrically compensate for this motion. It is understood, of course, that in certain applications of television, such as closed circuit viewing of factory operations or continuous monitoring of a desired view, the slight motion in the picture would not be objectionable. Therefore, the addition of compensating means may not be necessary. However, for such as commercial television applications and the like, this motion should be eliminated.

Figure 3:
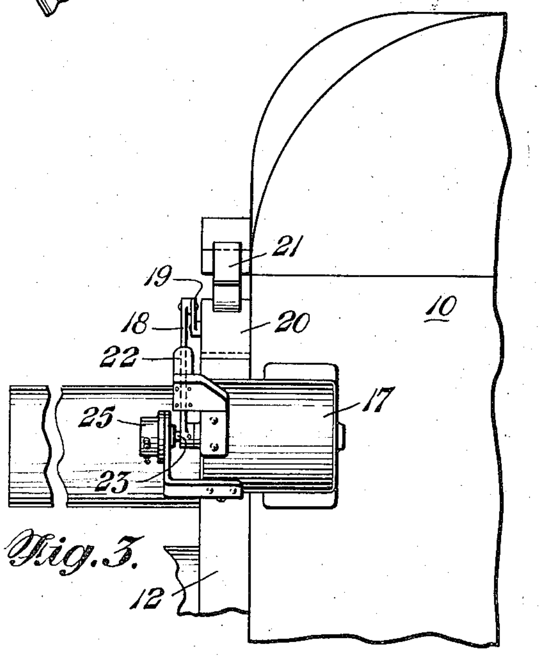
Fig. 3 is a side view of the motor unit shown in Fig. 2.

Fig. 3 shows one method of obtaining the desired compensation. Attached to the same shaft 23 of motor 17 as is the arm 18, is a potentiometer 25. As the shaft 23 rotates in first one direction and then the other, the resistance of the potentiometer is varied as will now be described in connection with Figs. 4 and 5.

Figure 4:
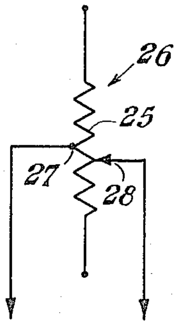
Fig. 4 is a conventional horizontal centering control circuit.

Fig. 4 shows a conventional horizontal centering control circuit, designated generally by the numeral 26. One terminal 27 is a center tap and a terminal 28 provides for manual adjustment as by potentiometer means.

Figure 5:
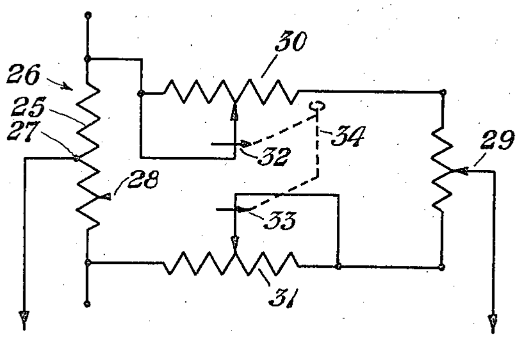
Fig. 5 is one modification to the horizontal centering circuit shown in Fig. 4.

Fig. 5 represents one possible modification in the horizontal centering control circuit to provide the electrical cancellation of the picture motion previously described. The center tap connection 27 remains the same. However, the potentiometer contact 28 is not used. Instead, potentiometers 30 and 31 are connected in series with a new potentiometer 29, all of which are connected in parallel with the original potentiometer 28. The shafts of potentiometers 30 and 31 are connected together to form a single manual adjustment 34. As the manual adjustment 34 is moved, the slider contacts 32 and 33 of potentiometers 30 and 31, respectively, are adjusted to manually center the image on the image-orthicon tube. These slider contacts 32 and 33 are so connected that this manual adjustment will not alter the total resistance of the circuit. Potentiometer 29 will be connected on the motor shaft 23 in place of the potentiometer 25, as shown in Fig. 3. Potentiometer 29 functions in an identical manner as potentiometer 25.

Figure 6:
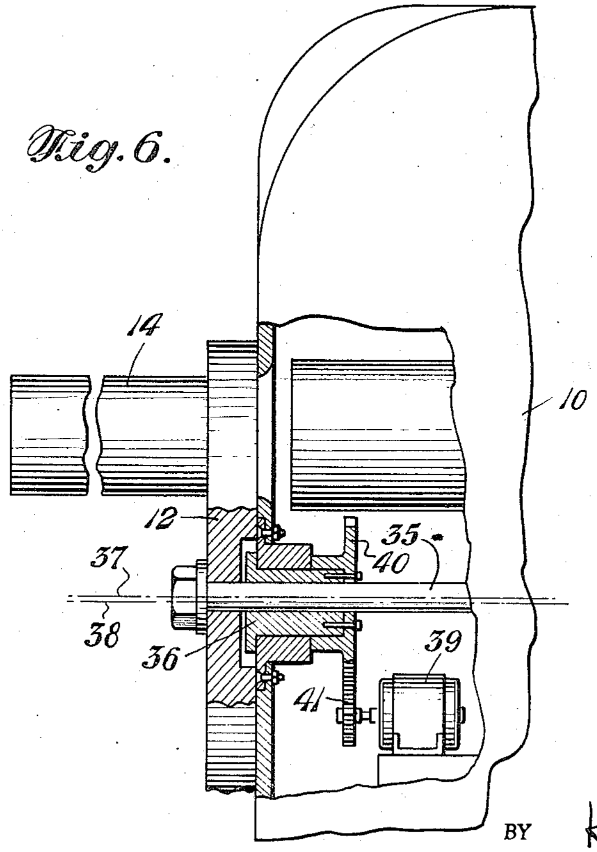
Fig. 6 is one modification of the present invention.

One possible modification of the present invention is shown in Fig. 6. The shaft 35, upon which is securely attached the lens mounting board 12, extends through a bushing or bearing 36 to the rear of the television camera. As shown in Fig. 1, a handle 13 provides means for rotating the shaft 35 and thus the lens mounting board 12 to select a desired lens. The bearing 36, Fig. 6, serves to support the shaft 35 on the camera casing 10. The center line of the bushing or bearing 36 is indicated by the numeral 37, and the center line of the aperture in the bearing 36 is indicated by the numeral 38 and coincides with the axis of the shaft 31 which passes through this aperture. This offset aperture in the bearing 36 may be any desired amount. The present preferred offset is approximately $\frac{1}{32}$ of an inch.

It can now be seen that by rotating the bushing 36, the offset aperture therein, indicated by the center line 38, will move around the center line 37 in a small circle. This motion of the shaft 35 will cause the lens 14 to move in a small circle also resulting in a circular motion imparted to the picture formed on the face of the image-orthicon 11.

To provide for a continuous movement in the picture on the image-orthicon and thereby to prevent "burn-in," a motor 39 may be used to keep the bushing or bearing 36 in constant rotation. The motor 39 may be connected to the bearing or bushing 36 by any suitable means. In the present preferred embodiment, two gears, 40 and 41, are used. The gear 40 is secured to the bearing or bushing 36, and the gear 41 is secured to the shaft of the motor 39. Therefore, by operation of the motor 39, the rotation of gear 41, which meshes with gear 40, will provide continuous rotation of the bearing or bushing 36. The speed of the rotation of the bushing may be any desired amount. Of course, the slower the speed, the less motion will be noticed in the picture transmitted. However, the motion should be fast enough to prevent the "burning-in" of the picture on the image-orthicon. One preferred speed is two revolutions per minute.

Figure 8:
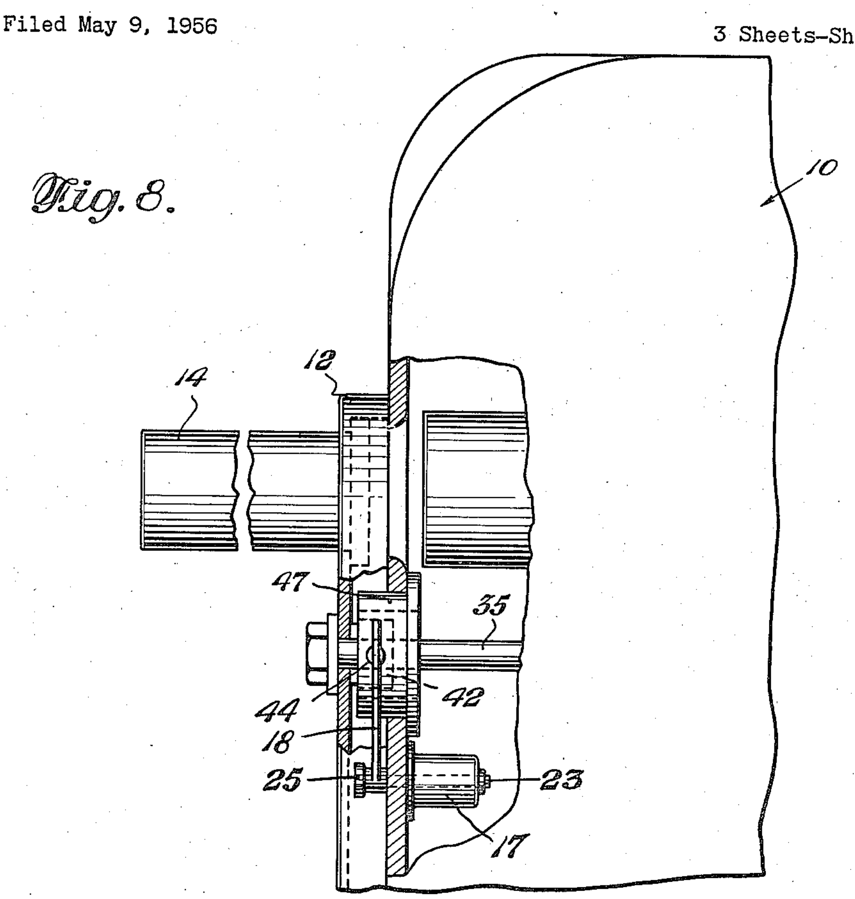
Fig. 8 is another modification of the present invention.

Another modification of the present invention is illustrated in Fig. 8. In this view, one lens 14 is shown secured to the lens mounting board 12 much the same as previously described. Also, the lens mounting board 12 is secured to a shaft 35, upon which is mounted a bearing 42. This bearing 42 is a support for the shaft 35 allowing shaft 35 to be rotated to revolve the lens mounting board in order to select a predetermined lens. The bearing 42 is supported by pins 43 and 44 within a small clearance indicated generally by the numeral 46. The clearance 46 may be any desired amount but it may be desirable to limit this clearance to a small dimension. The purpose of this clearance is to allow the bearing 42 to be shifted slightly in a predetermined direction.

To support the bearing 42, the pins 43 and 44 are slidably mounted in apertures in a fixed bearing 47. One of the supporting pins, as for example pin 44, is secured to an arm 18 much the same as the linkage 19 in Fig. 2 is secured to the arm 18 in said Fig. 2. The arm 18 is securely fastened to shaft 23 of motor 17. It may now readily be seen that by rocking the arm 18 first clockwise, then counterclockwise, the support bearing 42 will be moved first to the right, and then to the left, thereby imparting the desired motion in the scene viewed by the camera tube.

Figure 7:
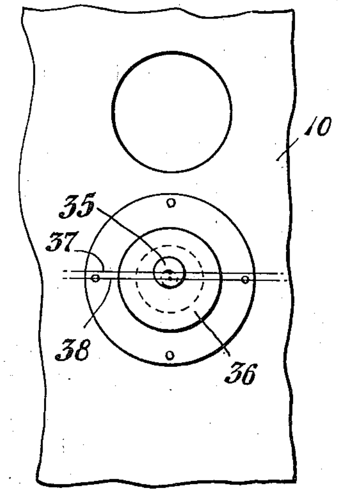
Fig. 7 is a front television of parts shown in Fig. 6 with the lens board removed.
Figure 9:
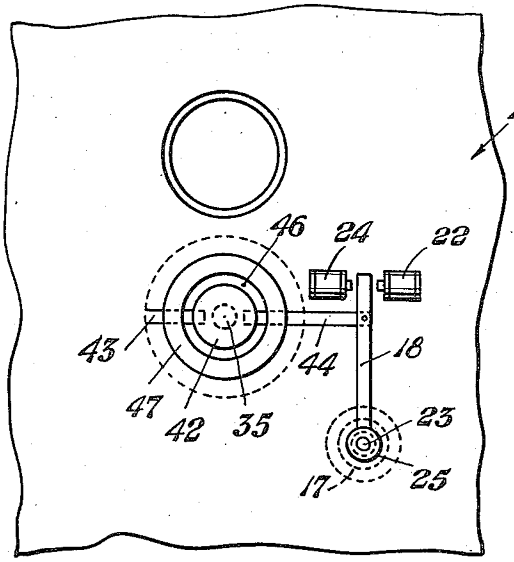
Fig. 9 is a front elevation of the parts of the modification shown in Fig. 8 with the lens board removed.

This modification just described in connection with Figs. 8 and 9 has an advantage over the modification shown in Figs. 6 and 7 in that the potentiometer 25 to provide for electrical cancellation of the motion may be secured to the shaft 23. The direct connection of such a potentiometer to the motor shaft will only be desirable when the motor shaft oscillates, first by rotating in one direction a predetermined amount and then in the opposite direction a predetermined amount. The rotation of the motor shaft in Fig. 6 is continuous in one direction, rendering it difficult to use a direct connected potentiometer. Therefore, by utilizing the bearing arrangement in Fig. 8, the potentiometer for the electrical cancellation of the motion may be employed.

Though the mechanisms described above are illustrative of means for causing movement of the picture projected on the tube of the television camera by movement of the lens, the same limitive movement may be effected by operation of the tube while permitting the lens to remain stationary and it is to be understood that it is within the skill of the art to effect such a reversal of parts in the light of this disclosure.

It is to be understood that the location of the motor and linkage therefor as described is not critical. For example, it may be built into the television camera, or it may be attached thereto as an auxiliary unit. Similarly, the specific electrical means utilized is not critical as equivalent means may be used, providing the desired electrical compensation for the picture motion on the camera tube is effected and it will be obvious to one skilled in the art to which the invention pertains that other equivalent electrical compensation means may be utilized.

It will be obvious to those skilled in the art that various changes may be made without departing from the spirit of the invention and therefore the invention is not limited to what is shown in the drawings and described in the specification but only as indicated in the appended claims.

What is claimed is:

1. In a television system, a television camera including a light sensitive camera tube for receiving light rays in an overall pattern and translating said light rays of said overall pattern into electrical energy whereby the overall pattern may be transmitted to a receiver, a horizontal centering control circuit connected to said camera tube, an element for adjusting said horizontal centering control circuit, said camera comprising means for focusing said light ray pattern on said tube in a normal position, means for slowly and definitely shifting said focused pattern from its normal position whereby the corresponding pattern viewed on said receiver would have an objectionably untrue and slow motion, said shifting means being connected to a second shifting means for moving said adjustment element for adjusting said horizontal control circuit to transmit the pattern to said receiver in said normal position and without said slow and definite motion, whereby damage to the camera tube is prevented and the received pattern is true.

2. The structure recited in claim 1, a lens on said camera, a driving means to move, one with respect to the other, said tube and said lens, said driving means being effective to cause said relative movement for a predetermined distance at a speed so slow that many scannings by said camera take place before said motion through said predetermined distance occurs.

3. The structure recited in claim 1, a lens on said camera, a motor means, and a linkage means to connect said motor means to said lens to provide said relatively slow motion to said lens in a given direction for a predetermined distance, said motor means and said linkage means being so coordinated as to drive said lens so slowly that many scannings of a single image are effected before said lens moves said predetermined distance.

4. The structure set forth in claim 2, wherein said predetermined distance is in the order of $\frac{1}{32}$ of an inch.

5. The structure set forth in claim 2, wherein said slow speed is in the order of about $\frac{1}{32}$ of an inch in one minute to $\frac{1}{32}$ of an inch in one half of a minute.

6. The structure recited in claim 1, a lens mounting board on said camera, a plurality of optical lenses mounted on said mounting board, means for selecting a predetermined lens through which to focus said pattern on said tube, a motor means, a linkage means to connect said motor means to said lens mounting board, and reversing means to cause said motor means to relatively slowly move said lens mounting board first in one direction and then in the opposite direction.

7. The structure recited in claim 1, a lens mounting board, an optical lens mounted on said lens mounting board, a shaft on which said lens mounting board is mounted, an eccentric bearing on said camera in which said shaft is rotatably mounted, means to relatively slowly rotate said eccentric bearing to cause movement in said optical lens.

8. The structure recited in claim 6, wherein said relatively slow movement corresponds to speed in the order of about $\frac{1}{32}$ of an inch in one minute to $\frac{1}{32}$ of an inch in one half of a minute.

9. The structure recited in claim 7, wherein the movement in one direction is in the order of about $\frac{1}{32}$ of an inch and the rotational speed is about one to two revolutions per minute.

10. The structure recited in claim 1, wherein said adjusting element is a potentiometer having a movable electrical contact mechanically connected to said first shifting means.

11. The structure recited in claim 8, wherein said adjusting element is a potentiometer having a movable electrical contact which is arranged for movement by said motor.

12. The structure recited in claim 9, wherein said adjusting element is a variable potentiometer means which is effectively varied by said rotating means.

References Cited in the file of this patent

UNITED STATES PATENTS

| | | |
|---|---|---|
| 2,479,517 | Schensted | Aug. 16, 1949 |
| 2,508,920 | Kell | May 23, 1950 |
| 2,632,864 | Hunter | Mar. 24, 1953 |